Jan. 1, 1946.  F. S. SMITH  2,391,929
METHOD AND APPARATUS FOR THE TREATMENT OF FLOUR AND THE LIKE
Filed May 24, 1941  3 Sheets-Sheet 2

INVENTOR
FRANKLIN S. SMITH
BY William T. Knierim
ATTORNEY

Patented Jan. 1, 1946

2,391,929

UNITED STATES PATENT OFFICE 2,391,929

METHOD AND APPARATUS FOR THE TREATMENT OF FLOUR AND THE LIKE

Franklin S. Smith, Bethany, Conn.

Application May 24, 1941, Serial No. 395,030

15 Claims. (Cl. 21—2)

This invention relates to a method and apparatus for the treatment of milled and other products in bulk, such as flour, for the destruction of life in the forms of its insect infestation and for the removal of such forms therefrom.

One of the objects of this invention is to provide an improved method and apparatus for treating products of the above-mentioned nature, more particularly for destroying the life of insect infestation contained therein and for effecting removal of the latter from the product. In products of the above-mentioned nature insect infestation may be present in various of its stages, such as in the form of eggs, larvae, pupae, or adults. In my co-pending applications Serial Nos. 296,543, 296,544, 321,680, 345,715 and 372,954, I have disclosed various forms of apparatus suitable for destroying the forms of life of insect infestation in products of the above-mentioned nature, such apparatus effecting movement of the particles of the product and of the forms of insect life in curved paths to cause them to set up centrifugal forces and to effect coactions with the apparatus to bring about a life-destroying mutilation of the forms of insect life. The treating units embodied in such apparatus are capable of various embodiments, illustratively those shown in the aforesaid applications, and they may be operated to avoid substantial breaking up of the forms of insect life.

In the typical milling practice, products of the above-mentioned nature frequently contain foreign material, such as pieces of string whose usual source is bolting apparatus or equipment utilizing agitators or brushes made up of cord or string and from which pieces of string become dislodged and pass on with the product. Such foreign material can sometimes effect undesired interference with the treating apparatus as, for example, by becoming lodged in a part of the treatment zone or zones and thus, to some extent, diminish the capacity and efficiency of the apparatus.

One of the objects of this invention is to provide a dependable, practical and inexpensive means for effecting, in treatment apparatus of the above-mentioned character, removal from the treated product of the forms of insect infestation. Another object is to provide a practical and simple means for effecting, in such treating apparatus, removal from the product of foreign material such as pieces of string and the like. Another object is to provide a product-treating apparatus of inexpensive construction for destruction of life in the forms of insect infestation and for effecting, in a simple, dependable and efficient manner, segregation from the particles of the product not only of foreign matter but also of the forms of insect infestation. Another object is to provide an efficient and dependable method and apparatus for eliminating from a product of the above-mentioned nature foreign substances, such as forms of insect infestation, foreign matter like pieces of string, and the like.

Another object is to provide an apparatus of the above-mentioned character that will be of simple, inexpensive and durable construction, efficient in action, easily maintained, and capable of sustained operation in practical use. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings in which are shown various possible embodiments of the mechanical features of my invention.

Similar reference characters refer to similar parts throughout the several views of the drawings.

Figure 1:
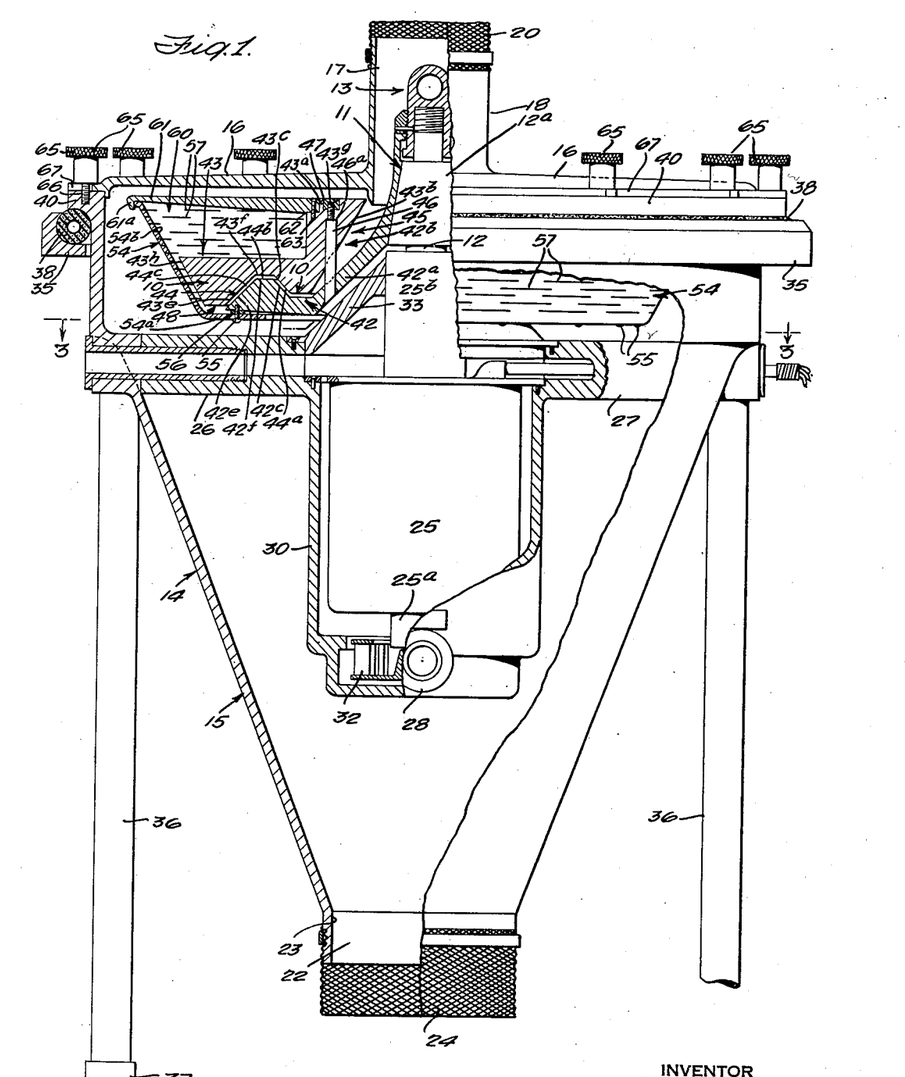
Figure 1 is a front elevation of one form of apparatus, certain parts being broken away and certain other parts being shown in central vertical section.

Referring first to Figure 1, I have there shown a rotary product-treating unit, for purposes of illustration, embodying certain of the principles of action disclosed in my above-mentioned applications, but in structurally and functionally improved form to achieve certain further objects and advantages; in Figure 1 this rotary treating unit is generally indicated by the reference character 10 and is mounted in any suitable way for rotation at suitable speed, preferably by way of a hub 11 interiorly tapered and fitted to and coaxially secured to the tapered portion 12ª of a shaft 12. These parts are secured together in any suitable way, preferably in a manner to permit ease of disassembly and at 13 is generally indicated a sleeve member threaded onto a threaded extension of the shaft 12 and constructed, as described in, for example, my application Serial No. 321,680, to coact with the hub 11 to clamp it onto the shaft or to pull it off for disassembly.

Shaft 12 is preferably supported for rotation about a vertical axis, within a casing-like structure generally indicated at 14 and comprising several sections, such as the lower section 15 and the upper section 16.

The upper section 16 is provided with an inlet passage 17 formed by a cylindrical flange 18 which extends both externally and internally; to the external portion of the flange 18 may be connected a tubular conduit 20 of suitable flexible material and thereby connect the apparatus to receive the product to be treated, usually from the discharge end of a machine or apparatus forming part of the usual production equipment employed in the milling of the products to be treated. The lower casing section 15 is provided with an outlet passage 22 flanged as at 23 so that a conduit 24 may be connected to it to discharge the treated product from the apparatus for movement onto the next machine or apparatus, such as a bagging or packing machine.

In the preferred and illustrative form, the treating unit 10 is electrically driven and in such case the shaft 12 preferably comprises the shaft of an electric motor of which the casing is shown in Figure 1 at 25, being provided in any suitable way with suitable bearings, such as combined radial and thrust antifriction bearings, mounted in extensions 25ª and 25ᵇ of the casing 25.

In the illustrative arrangement the motor casing 25 is rigidly secured to and within the casing structure 14 in any suitable way. Preferably, the motor is of the enclosed fan-cooled type and the mounting means for the motor may form part of the air cooling system of the motor, as described in detail in my application Serial No. 296,544. For present purposes, it is sufficient to note that the motor casing 25 is rigidly secured to the lower casing section 15 by two diametrically opposed bracket structures 26, 27 adjacent the upper end of the casing 25 and two diametrically opposed and alined bracket structures 28 in the lower end of the casing. The two pairs of brackets 26—27 and 28 extend along diameters that make an angle to each other of say 90° and the brackets may be secured to or formed integrally with an outer jacket or casing 30 surrounding the motor casing 25 and, with the brackets hollow or tubular, thus form connections or passages from the outside of the apparatus casing 14 to the inside of the jacket casing 30. Air may be impelled through the jacket in any suitable way, as, for example, by means of an air impeller 32 accommodated in the lower portion of the jacket structure and secured to and driven by the lower end of the motor shaft 12.

Thus, bracket 26 may serve as an inlet and brackets 28 serve as outlets for the air which absorbs the heat losses in the motor dissipated through the motor casing 25.

A frusto-conical member 33 is interfitted at its lower and outer end with the upper end of jacket 30 and at its upper and inner end is interfitted with the bearing extension 25ᵇ, thus forming a strong brace to transmit to the casing structure 14 strains or thrusts which shaft 12 might exert.

The rotating parts of the apparatus are preferably constructed to be dynamically balanced and, as described in my above-mentioned applications, provision is made for preventing overstressing of parts or causing unsafe vibration or other undesirable effects due to the occurrence of conditions of unbalance arising during operation of the treating unit. Where, as in the illustrative forms in the drawings, the shaft 12 is rigidly supported from the casing structure 14, I preferably support the latter so that it and the internally supported rotating parts may precess when a condition of unbalance arises.

Such a supporting arrangement may comprise a ring-like frame member 35 supported by suitable standards 36 which may be secured to the floor, as at 37, member 35 carrying a resilient or cushioning member 38, illustratively of rubber and preferably in tubular form and resting in a suitable seat that extends around the member 35. The upper peripheral portion of the lower casing section 15 is provided with an outwardly directed peripheral flange 40 having a downwardly facing concave peripheral seat to take the cushioning member 38, the latter being thus interposed between members 35 and 40. Tubular member 38 is sufficiently thick-walled and of a suitable quality to give the desired resiliency of action and to carry the load without permanent deformation.

The product to be treated enters the apparatus through the inlet passage 17 and by the flange structure 18 is guided to the treating unit 10. In so far as certain features of my invention are concerned, the treating unit 10 may be given any suitable structural form to provide it with a product inlet adjacent its axis of rotation and a product outlet at a greater radial distance from its axis, with an intervening space or zone or spaces or zones in which, under the action of the centrifugal forces set up in the forms of insect infestation by the rapid rotational movement given them by the treating unit, life in the insect forms is destroyed; in my above-mentioned applications, several such possible structural forms of the treating unit are disclosed. To achieve certain additional advantages, the treating unit per se is preferably of the form or forms described herein and may have one or more treatment spaces or zones.

Thus, referring again to Figure 1, the treating unit 10 may comprise an annular carrier member 42 preferably formed integrally with the hub 11 and it supports or has related to it one or more members to provide a corresponding number of intervening treatment spaces. In Figure 1 carrier member 42 has related to it an element 43 to provide therebetween a treatment space 44 and parts 42 and 43 may be given a configuration substantially as shown in Figure 1.

Thus, carrier member 42 has a generally frusto-conical portion 42ª whose outer surface 42ᵇ merges preferably in a suitable curve with the correspondingly downwardly and outwardly diverging face of the hub 11, and it is onto this external face that the product with its insect infestation and foreign matter is guided by the lower end of the inlet flange structure 18 of the casing; with the treating unit rotating at a suitable speed, the particles of the product, insect infestation, and foreign matter are thus given rotary movement at velocities to cause them to set up centrifugal forces and, in coaction with other parts, to insure entry thereof into the treatment space 44. Member 43 has an inner ring-like portion 43ª presenting an internal frusto-conical face 43ᵇ juxtaposed to the face 42ᵇ, the face 43ᵇ making an angle, say of 50°, to its axis which is coincident with the axis of rotation of the treating unit, so that product particles, such as flour, for example, will not immovably pile up on or against it. Faces 42ᵇ and 43ᵇ, with the inward extension of flange 18 extending downwardly in between them, as shown in Figure 1, thus form a downwardly and outwardly directed and gradually converging mouth 45 to guide the particles to the treatment space 44. Any particles moving outwardly away from the rotating face 42ᵇ, under the action of the centrifugal forces set up in them, are, when they engage the face 43ᵇ, continued in rotation, and with the radii of their path or paths of movement increasing, the increasing centrifugal forces they set up are effective to cause them to slide or move downwardly along the face 43ᵇ and hence and ultimately into the treatment space 44.

The treatment space 44 may comprise several successively arranged sections, such as sections 44ª and 44ᶜ connected by section 44ᵇ and these may be provided by companion faces on or configurations of the members 42 and 43. Thus, section 44ª may be formed by preferably parallel frusto-conical and suitably spaced faces 42ᶜ and 43ᶜ of members 42 and 43, respectively, giving the section 44ª an upward and outward direction at an angle to the axis of say 45°. Section 44ᶜ is formed by preferably parallel frusto-conical and suitably spaced faces 42ᵉ and 43ᵉ of members 42 and 43, respectively, giving the section 44ᶜ a downward and outward direction at an angle to the axis of say 45°. The connecting section 44ᵇ may extend at an angle of say 90° to the axis and is formed by preferably parallel suitably spaced faces 42ᶠ and 43ᶠ of the two members. The thickness of the treatment space 44 and hence of its various sections may be on the order of ⅛", and following substantially the proportions indicated in Figure 1, the maximum diameter of the carrier member 42 may be on the order of 16".

The element 43 may be held in spaced relation to the carrier member 42 by any suitable means, illustratively and preferably by a suitable number of studs 46, anchored in any suitable way in upstanding position to the carrier member 42, preferably in the frusto-conical portion 42ª thereof, and uniformly distributed about a circle, being illustratively four in number. Studs 46 may be shouldered, as at 46ª, to coact with corresponding shoulders in stepped holes 43ᵍ in the portion 43ª of the element 43, the upper ends of holes 43ᵍ being countersunk to accommodate nuts 47 threaded onto the upper threaded ends of the studs 46 and thereby clamp the element 43 against the shoulders 46ª of the studs.

The studs 46, though bridging across the intake mouth 45, do so at an angle to the general extent of the mouth and, with the studs round in cross-section, present to the downwardly and outwardly flowing product or material an oval or streamlined cross-section. The particles of the product, insect infestation, and foreign matter thus bypass the securing studs with low resistance to flow and are entered into the section 44ª of the treatment space, all the time being kept in rotary movement at substantial velocity and due to the centrifugal forces they exert move in an outward direction along the section 44ª but against the face 42ᶜ, along which they move and are pressed in outward and upward direction and in expanding curvilinear paths about the axis of rotation of the treating unit, progressing these particles toward the next section, such as section 44ᵇ. But with the parts appropriately dimensioned, as, for example, indicated above, and with a suitable speed of drive, the layer of particles that progresses upwardly and outwardly along the face 42ᶜ becomes progressively thinned out as the radius and linear velocity increase and due to the increased centrifugal forces they exert, the various forms of insect infestation are pressed against the face 42ᶜ, resulting in a life-destroying deformation, an action which is enhanced due to the rubbing or abrading action, while under such pressure, between the form of insect life and the face 42ᶜ as the former progresses along the latter.

From section 44ª of the treatment space 44, the materials undergoing treatment progress into the section 44ᶜ, where such actions as have just been described take place, but at greater intensity, along the face 43ᵉ, but due to the change in direction, that is, downwardly along section 44ᶜ as compared to upwardly along section 44ª, the now faster moving and thinner layer of particles of product and insect infestation is laid, in effect in relatively inverted position or relationship, against the effective face of the treatment space. Thus, for example, should any form of insect infestation, while in the section 44ª, find itself in the upper portion of the layer and hence possibly cushioned against direct contact with the face 42ᶜ, such form or stage of insect life finds itself, when the layer is brought into section 44ᶜ, virtually at the bottom of such layer and hence in direct contact with the face 43ᵉ. But very likely, and particularly where the connecting section 44ᵇ is of substantial radial dimension, the transition of the material therethrough is accompanied by a mixing or commingling action so that the layer that is laid against and that progresses along the face 43ᵉ, and also progressively thinning out as the radius increases, might well have its product particles, insect infestation forms or particles and particles of foreign matter arranged in quite different physical relationships. Foreign matter like pieces of of string pass through the treatment space without clogging it.

Dependable destruction of life in the forms of insect infestation results and with dimensions like those above indicated and with a speed of drive on the order of 3500 R. P. M. Breaking up or further milling of the product particles and also substantial breaking up of the forms of insect infestation may be avoided, and the particles of the product and the forms of insect infestation, now with the life therein destroyed, and foreign matter in the product, are tangentially and peripherally discharged through the discharge mouth 48.

Figures 2, 3, 5, 6:
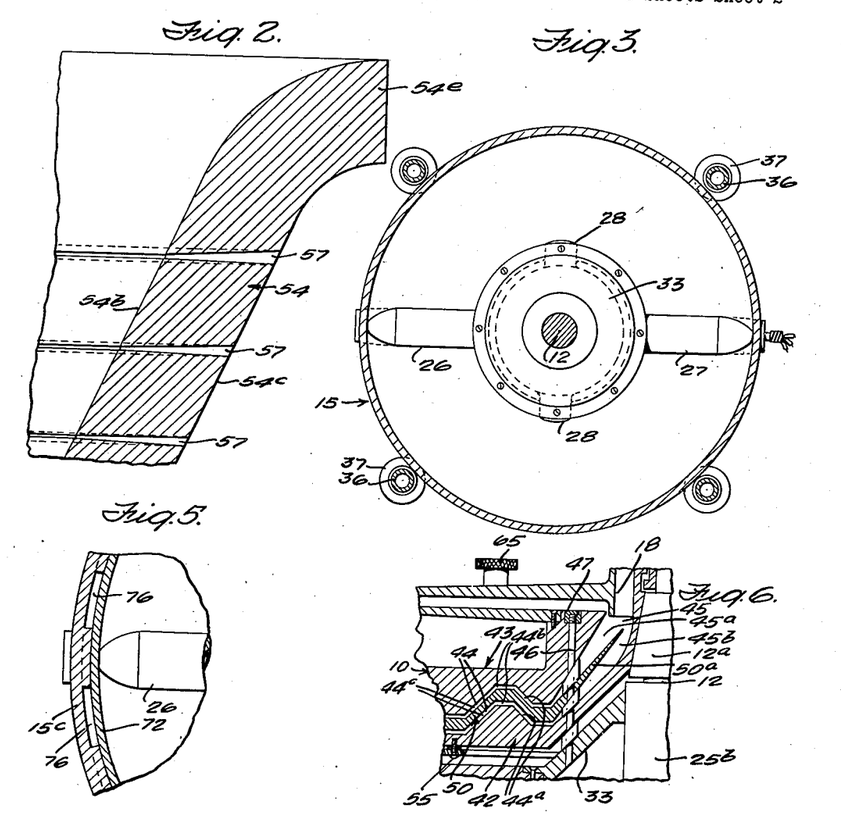
Figure 2 is a fragmentary vertical sectional view on a greatly enlarged scale of a part of the rotary treating unit shown also in Figure 1.
Figure 3 is a horizontal sectional view of the apparatus as seen along the line 3—3 of Figure 1.
Figure 5 is a horizontal sectional view as seen along the line 5—5 of Figure 4.
Figures 6 and 7 are detached vertical sectional views, with certain parts omitted or broken away, showing the treatment units of Figures 1 and 4 constructed to provide more than one treatment space or zone.

If in the treatment unit 10 of Figure 1 it is desired to provide several treatment spaces instead of the one treatment space 44, there may be interposed between the carrier member 42 and the element 43, in suitably spaced relation, as many additional elements as there are to be additional treatment spaces, for example, in the manner shown in Figure 6 where one such additional interposed element is indicated by the reference character 50. In Figure 6, therefore, the parts 42 and 43 may be constructed substantially as in Figure 1, while member 50, being annular, is interposed therebetween and has a cross-sectional configuration to provide between its upper face and the lower face of member 43, and between its lower face and the upper face of carrier member 42 two treatment spaces 44 each having sections 44$^a$, 44$^c$ and 44$^b$, the inner substantially frusto-conical portion 50$^a$ of the interposed member 50 dividing the intake mouth 45 into two mouths 45$^a$, 45$^b$, their upper ends being interrelated to the intake flange 18 in a manner substantially to divide the incoming product into two annular streams of substantially the same cross-sectional area. The spacing between the parts 42, 50 and 43 and the assembly of the latter are achieved by the studs 46 which may be appropriately stepped or provided with spaced collars, or the like.

Figures 7, 8:
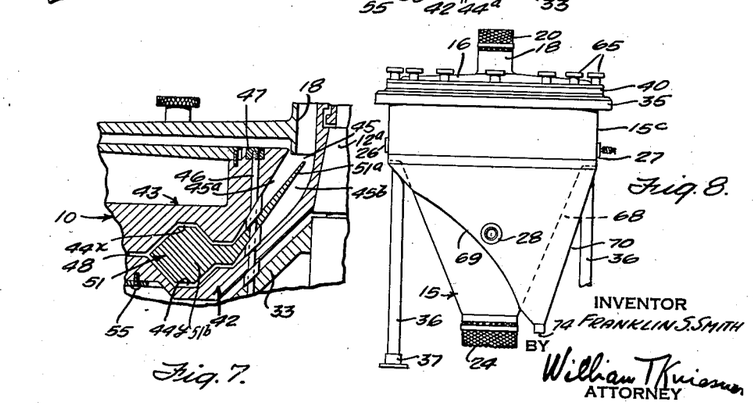
Figure 8 is a front elevation on a small scale showing the apparatus of Figure 4.

If desirable, two treatment spaces may be provided in the manner shown in Figure 7, where the interposed member is shown at 51 and has a part 51$^a$ to subdivide the mouth 45 into two mouths 45$^a$ and 45$^b$, such as in Figure 6, and a part 51$^b$ presenting sets of faces exposed upwardly to coact with corresponding faces in the member 43, thus to provide an upper treatment space 44$^x$, and similar faces but directed or exposed downwardly to coact with similar faces in the member 42 to provide a treatment space 44$^y$, the latter being upwardly divergent in the arrangement of its sections and treatment space 44$^x$ being downwardly divergent, and both of them terminating in a single discharge mouth 48. Here the spacing and assembly may be achieved in the manner described above in connection with Figure 6.

Referring again to Figure 1, I now subject the particles of the product, the forms of insect infestation, now with life therein extinguished and preferably in substantially unbroken up condition, and other foreign material, such as pieces of string, all discharging from the outlet or discharge end of the treatment space or spaces in the treating unit, to continued rotary movement which causes them to exert centrifugal forces and to coact with an element generally indicated at 54 in Figure 1, to effect segregation from the product of the particles of the dead forms of insect infestation and other foreign matter.

Element 54 is in general frusto-conical in shape with its lower and lesser diametered end adjacent the discharge end 48 of the treatment space or spaces, and it is secured to the treating unit in any suitable way, preferably by means of a ring or flange portion 54$^a$ which underlies the outer portion of member 42 and to which it is secured as by screws 55 in suitable number and spaced uniformly about a circle. Interposed between the member 42 and the securing element 54$^a$ are suitable spacer means, such as washers 56, one for each screw 55, thus leaving spaces or passageways for the entry, from the interior of the casing structure 14, of air, for a purpose later described.

Element 54 presents an internal surface 54$^b$ that is preferably frusto-conical and that slopes upwardly and outwardly at an angle of say 60° to the horizontal.

The material discharged from the treatment space or spaces is discharged tangentially into engagement with the lower end of the face 54$^b$ and its particles, under the coaction of the centrifugal forces which they set up with the angle of slope of the face 54$^b$ move in curvilinear paths of increasing radius and hence upwardly along the face 54$^b$, thinning out more and more, in layer form, as the radius and linear velocity increase. To aid in this action it is preferable to provide, in juxtaposition to at least the lower portion of the frusto-conical face 54$^b$, and spaced therefrom substantially as shown in Figure 1, a surface or face 43$^h$ preferably formed in and carried by the element 43 of the treating unit. This face 43$^h$ aids in keeping all particles in coacting relation to the face 54$^b$ in that, should any particle dislodge itself from the layer moving upwardly along face 54$^b$, such dislodged particle engages the moving face 43$^h$ and is by the latter again set into rotary movement at sufficient velocity to cause such particle to be thrown tangentially away from the face 43$^h$ and hence against the face 54$^b$ or the material moving upwardly along the latter.

The element 54 is provided with slits 57 which are preferably uniformly distributed throughout it, for example, in vertical and horizontal rows, as indicated, but in staggered relationship so that any path from the lower end of face 54$^b$ toward the upper end thereof crosses a slit and preferably many of them.

The stilts 57 are preferably tapered, as is better shown in the large sectional view of Figure 2, having their narrower ends in the face 54$^b$ and their larger ends in the outer face 54$^c$ of element 54; the width of the slits at their narrower ends is on the order of 0.004″ and the width at their larger ends is on the order of 0.012″.

An illustrative arrangement of the slits may comprise circular rows with the rows spaced about ⅛″ from each other; in each row, each slit may be 19° long and the space between slits may be 11°. Thus, a slot with an adjacent space occupies 30° and hence each row may comprise twelve slits of 19° spaced from each other by 11°. The slits of one circular row, however, are staggered with respect to those of the adjacent row so that a slit of one row overlies a space in the adjacent row.

Element 54 with its slits may be constructed in any suitable way, as, for example, by milling the slits in the metal in which case a substantial wall thickness for element 54 may be provided, for example, a thickness on the order of ⅛″. Or the element 54 may be built up and the slits formed in the process of building up, by electrodeposition of metal onto a matrix and in such case it is preferable that the wall thickness be substantially less than that above-mentioned.

Accordingly, as the material progresses upwardly along the face 54$^b$ in the manner above-described, and it does so in a progressively thinning layer, the product particles, having maximum dimensions less than the minimum slit width, illustratively the above-mentioned 0.004″ width, pass into the slits and are discharged tangentially through the larger ends thereof and into the casing structure 14 for discharge out of the apparatus through the outlet passage 22, such emission of product particles through the slots as the layer progresses upwardly along the face 54$^b$ contributing toward the thinning out of the layer. The slits are sufficient in number and disposition to have a discharge capacity commensurate with or preferably greater than the capacity of the treating unit 10. Foreign material, including pieces of string and the like, and the dead forms of insect life, having dimensions greater than the minimum slit width, such as the above-mentioned 0.004" width, pass over the slits without entering them and under the centrifugal forces they exert in coaction with the slope of the face 54b continue to travel upwardly and outwardly along the face 54b. Hence, at the upper peripheral region of the face 54b, there will be present only such foreign matter and dead forms of insect life, having bypassed the slits 57, the particles of the product having been discharged through the slits.

The discharge of the product particles through the slits 57 is accompanied by the movement therethrough of air, air being discharged by a physical action similar to the action upon the product particles, resulting from the coaction between the centrifugal forces set up in the air and the relationship of the face 54b of the element 54. Such air movement through the slits 57 aids in effecting the discharge of the product particles, the latter being precluded from clogging the slits due to the tapered construction thereof as better shown in Figure 2, and the air, moving therethrough, aiding in keeping them swept clean. To oppose the building up of air pressure in the space within the casing structure 14 into which air and particle products are discharged, I preferably feed air from such space through the gaps or inlet passages formed between the spacing washers 56 (Figure 1) and hence supply such air to the region along the face 54b of element 54 to take part in actions like those just described. Accordingly, a certain amount of air is repeatedly recirculated.

The now segregated forms of insect life, foreign matter, and the like, are thus precluded from passing on with the product particles, and I make suitable provision for collecting them together and removing them from the apparatus. In one form, as in Figure 1, I provide a chamber or space 60 which may be formed by an annular plate member 61 having its inner periphery fitted and seated in a rabbet 62 formed in the portion 43a of the element 43 and to which it is detachably secured as by screws 63, its outer peripheral end preferably engaging the upper periphery of the element 54, thus, with the latter and the member 43, to form the enclosure or chamber 60.

Preferably, the outer peripheral end of element 54 is flanged outwardly, as at 54e, to give it better rigidity and also to present a peripheral edge receivable within a downwardly extending flange 61a of the plate 61, and the latter may thus brace the element 54.

In this arrangement it is within the chamber 60 that the segregated matter, including the forms or stages of insects, is gathered against commingling with the discharged product itself. Under the action of the apparatus such material is segregated from the product particles by the time the material arrives in the regions of the upper end of the face 54b, and from such region the segregated material may be removed. Removal thereof, in the form of apparatus shown in Figure 1, may be effected by removing nuts 47 and lifting member 43 and the plate member 61 out as a unit, whence the segregated material is removed from the parts 42 and 54. For such purposes, also, access to the interior of the casing structure may be easily gained as by removing the upper casing part 16. For such purposes the latter is preferably detachably secured in place as, for example, by removable thumb nuts 65 coacting with threaded studs 66 carried by the part 40 of the lower casing structure 15, the upper casing part 16 having a flange 67 resting upon the part 40 against which it is detachably clamped by the thumb nuts 65.

Figures 4, 9, 10:
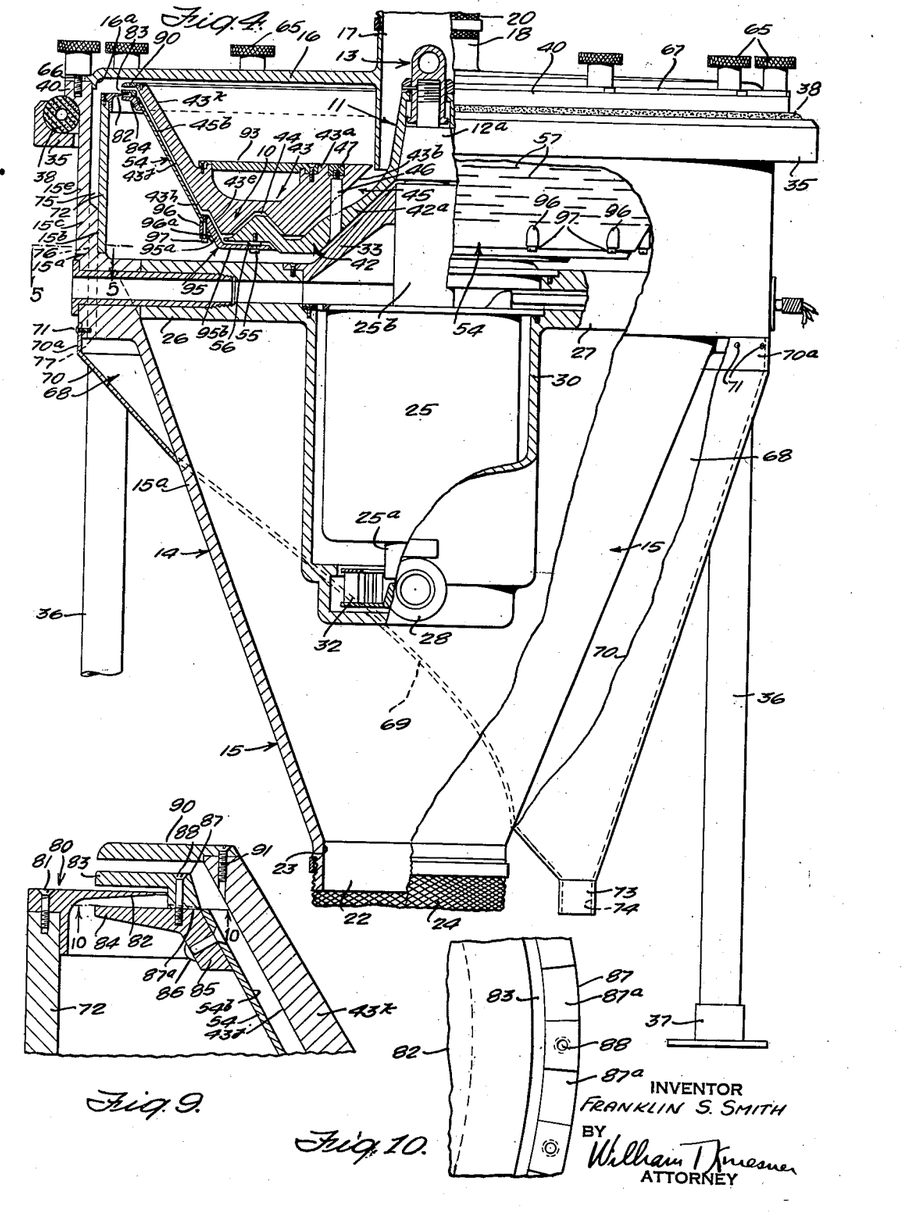
Figure 4 is a view like that of Figure 1 showing another form of apparatus.
Figure 9 is a detached portion of the sectional view of Figure 4, showing certain portions of the latter on a larger scale.
Figure 10 is a fragmentary view as seen along the line 10—10 of Figure 9.

However, I may and preferably do effect continuous removal of segregated materials from the upper region of the face 54b and a preferred and illustrative arrangement is shown in Figure 4. In the form of Figure 4 I form a chamber 68 by utilizing for its inner wall at least a part of the frusto-conical casing section 15 and for its external wall a sheet metal wall member 70 having an upper cylindrical flange 70a that interfits with the upper cylindrical portion 15a of the lower casing section 15, being secured thereto in any suitable way, as by screws 71. Part 70, preferably made of sheet metal, may be in the form of an obliquely truncated cone, as is better shown in Figure 8, intersected by the frusto-conical casing part 15 along a closed curved line indicated at 69, the axes of the two conical parts being at an angle, thus to bring the apex of the external wall part 70 off to one side and the apex being provided with suitable means, such as a cylindrical flange 73, to form a discharge outlet 74 for the removal from the chamber 68 of materials discharged into it.

Referring to Figure 4, the upper cylindrical portion 15a of the lower casing section 15, the latter being preferably in the form of a casting, is provided with an internal cylindrical step or rabbet 15b to form a seat for the reception of a cylindrical baffle or wall member 72, preferably made of a suitably hard or hardened metal to resist wear and terminating at its upper end in a plane substantially coincident with the plane of the upper end of the element 54. The portion 15c of the cylindrical wall in which the rabbet or seat 15b is formed is of lesser internal radius than the remaining upwardly extending portion 15e, the portion 15e thus coacting with the inserted baffle member 72 to form therebetween an annular passageway 75. This passageway 75 is in connection with the chamber 68 by way of vertically extending preferably parallel and spaced cored passages 76 (see Figures 4 and 5) whose upper portions are in the form of slots in the wall portion 15c and closed by the baffle member 72 and whose lower portions are cored passages extending downwardly through the remainder of the upper cylindrical portion 15a, their lower open ends 77 opening into the chamber 68 (see Figure 4). One or more of such passages are interrupted by the bracket structures 26, 27 where that type of mounting is employed, but the remaining passages are sufficient in number and in cross-sectional area to have adequate carrying capacity.

Accordingly, segregated dead forms of insect life and foreign matter, if discharged into the upper open end of the annular passageway 75, pass downwardly in the latter and by way of the passages 74 enter the chamber 68 from which they may be removed by way of the outlet passage 74. Product particles discharged through the slits 57 in the element 54 are deflected downwardly by the baffle plate 72 into the lower portion of the lower casing section 15 for discharge through the discharge outlet 22. Transfer of the segregated material from the upper regions of the rapidly rotating element 54 to the annular passageway 75 I effect without risk of discharging any of it into the space into which the product particles are discharged, preferably by way of a construction about to be described.

Thus, for example, I provide at the upper end of the baffle or wall member 72 a ring member 80 rabbetted to interfit with the member 72 and secured thereto as by screws 81, ring member 80 having an internally extending tapering flange 82 received between but spaced from two outwardly directed flanges 83, 84 carried by and hence rotating with the element 54, at its upper end.

Flange elements 83 and 84 are preferably constructed for convenience of assembly and disassembly of the various parts. Thus, flange 84 comprises an outward flange extension of a ring member 85 having an internal frusto-conical face to engage and mate with the external frusto-conical face at the upper end of the element 54 to which it is secured in any suitable way, as by rivets 86. Flange 83 is an outward extension of a ring member 87 seated against the upper face of the ring member 85 and detachably secured in position as by screws 88. Accordingly, the segregated materials, under the centrifugal forces they exert, move upwardly and outwardly from the upper end regions of the face 54ᵇ of the element 54 and over the parts 87, 83 and 80, and hence into the passageway 75, the passageway formed by the spacings between the flange elements 83, 82 and 84 being in effect a labyrinth-like path or seal against movement therethrough of any particles.

The effectiveness of such seal, however, I prefer to better insure and this I may do by causing the flow of air in a general outward direction and into the gap between the flange elements 83 and 84. For this purpose, I provide in the under face of the ring member 87 slots which are preferably uniformly spaced throughout and which in axial direction are of increasing dimension with increasing radius as is better shown in Figures 9 and 10. The minimum depth of these slots may be on the order of 0.004" and the maximum may be on the order of 0.012", and hence when the ring member 87 is secured with its milled or slotted face against the upper face of the ring member 85, the slots 87ᵃ become slits analogous to the slits 57 in the element 54, being insufficient in dimension to pass therethrough the segregated foreign matter or particles thereof, while air is freely forced therethrough by the centrifugal forces set up by the air itself, the air discharging into the gap between the flange elements 83 and 84. Of this discharged air, some of it is forced between the flanges 82 and 84 and into the space into which the product particles are discharged, and this discharging and moving air thus blocks movement of product particles, particularly where they are minute particles like those of flour, from entering the upper regions of the casing structure. Another portion of the air moves outwardly in between the flange 82 and the flange 83 and blocks movement of particles of segregated material including forms of insects in reverse direction and hence blocks entry of such particles into the space into which the product is discharged.

The member 43 of the treatment unit 10 has an upward and outwardly directed frusto-conical extension 43ᵏ, thus forming by its outer face 43ʲ an extension of the face 43ʰ described in connection with Figure 1. Face 43ʲ, acting like the face 43ʰ above-described, thus insures the continued upward movement along the face 54ᵇ of element 54 of the particles of the various materials as well as air, all for coaction with the element 54 and the parts carried by it. At the upper end of the extension 43ᵏ is an outwardly directed flange member 90 constructed separately from the member 43 and hence interfitted therewith and secured as by screws 91. Member 90 overlies the upper face of the flange 83 and forms with it a peripherally extending and outwardly directed discharge guiding outlet for the segregated material. An internal peripheral portion 16ᵃ of the upper casing part 16 may be shaped, as indicated in Figure 4, to deflect discharged segregated material into the upper open end of the passageway 75.

An annular plate member 93 may be utilized to bridge across the portion 43ᵃ and extension 43ᵏ of the member 43 to give the upwardly exposed portions of the member 43 or the treating unit 10 a substantially regular or unbroken face of which the internal frusto-conical face of the upper portion of extension 43ᵏ becomes a part, giving a construction that prevents the accumulation of materials upon the upper face thereof, any such materials being tangentially discharged through the space between the flange 90 and the upper casing part 16 and hence into the passageway 75.

In Figure 4 I have also illustrated a preferred form of mounting of the element 54 to the carrier member 42, particularly where the element 54 is made relatively thin as, for example, when it is formed by electro-deposition in which case its thickness is in the order of 0.015" and is preferably made of a metal of sufficient tensile strength and hardness, for example, nickel. For simplicity of construction, element 54 is preferably truly frusto-conical and at its lower end fits over and mates with the frusto-conical portion 95ᵃ of an annular mounting member 95, being clamped thereto as by a ring 96 having an internal frusto-conical face 96ᵃ mating with the external face of the member 54, screw 97 threaded into the portion 95ᵃ effecting a clamping of the lower portion of element 54 between part 95ᵃ and part 96. In such case, a lower region or portion of the face 43ʰ, indicated at 43ᵉ, of member 43 is stepped back, as indicated in Figure 4.

Mounting member 95 has a flange portion 95ᵇ corresponding to the flange 54ᵃ of Figure 1 and it is secured to the under face of carrier member 42 by screws 55 with spacer washers 56 interposed therebetween to provide passageways for the bleeding of air from the lower interior of the casing structure into the rotary part of the apparatus.

Though the treating unit of Figure 4 is shown with a single treatment space 44, corresponding to the showing of Figure 1, it is to be understood, as was pointed out in connection with Figure 1, that the treating unit may be constructed with more than one treating space, illustratively in the manner indicated in Figures 6 and 7.

Thus, it will be seen that there has been provided in this invention a method and apparatus in which the various objects above noted, together with many thoroughly practical advantages are successfully achieved. The particles forming the mixture of product particles, forms of insect life in dead condition and foreign matter, in emerging from the treatment space or spaces, are moving at substantial linear velocities and in curved paths appropriate for immediate coaction with the slit-bearing element or member. The immediately ensuing actions that take place, such as those above described, proceed at a high rate, contributing toward a high capacity of efficient handling of the materials by the apparatus. It is probable that, during these actions and as the forms of insect life proceed, in curved paths, toward the upper region of the inner face of the slit-bearing element, destruction of life can and does take place in any insect forms that may have escaped life-destroying action in the treatment space, and thus I may additionally insure that the segregated material does not include life-bearing insect forms or stages. Also, should the life-destroying action in the treating unit be for any reason impaired or made less effective or less efficient, the product, nevertheless, emerges from the apparatus with forms or stages of insect infestation, whether dead or not, dependably segregated therefrom and as a life-free pure product.

The product particles emerge from the discharge outlet of the casing structure in condition for immediate packaging and, moreover, in such condition that I may dispense with subsequent bolting operations. The apparatus, when interposed in a line of milling machinery or equipment, may thus also make it possible to dispense with a subsequent bolting operation and corresponding bolting operations. Also, it will be seen that the apparatus is well adapted to meet the varying conditions of hard practical use.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In apparatus for effecting the destruction of insect life in a flowable product composed of individual solid parts, the combination of, a casing-like structure having an inlet passageway for the product and having an outlet passageway therefor, rotary treating means within said structure having a product-inlet adjacent its axis for receiving product from said inlet passageway and having product-discharge means radially spaced from said inlet means, said discharge means having apertures dimensioned to pass the product particles therethrough while retaining the forms of insect life, means for driving said rotary means to effect flow of the product to said discharge means, means interposed between said inlet means and said discharge means, means for destroying all life in the forms of insect infestations.

2. An apparatus as claimed in claim 1 in which there is a chamber for receiving the particles of insect life separated from the product by the discharge means.

3. In apparatus for treating a flowable product composed of individual solid parts, the combination of, a casing structure having an inlet passageway for the product and having an outlet passageway therefor, rotary treating means within said structure having axially disposed product inlet means adjacent said inlet passageway for receiving the product and having a product discharge member radially spaced from said inlet means, said discharge member being substantially frusto-conical in shape and having aperture means therein dimensioned to pass the product particles therethrough while retaining all particles of insect life, means for driving said rotary means to effect flow of the product to said discharge member, and means interposed between said inlet means and said discharge member for destroying all insect life in the product, whereby the particles of insect life are separated from the product as the product flows over the slanting surface of said discharge member.

4. An apparatus as claimed in claim 3 in which there is a means for receiving all insect particles after separation from said product comprising means forming a substantially annular space extending about said rotary treating means and having a substantially annular mouth adjacent the edge of said treating means having the greatest diameter whereby the particles of insect life which have been separated from said product enter said annular space.

5. An apparatus as claimed in claim 3 in which the axis of the rotary means is vertical and the discharge member is in the form of an inverted frusto-cone with its greatest radius at the top.

6. An apparatus as claimed in claim 3 in which the axis of the rotary means is vertical and the discharge member is in the form of an inverted frusto-cone with its greatest radius at the top, and the casing structure has an annular chamber with a mouth adjacent the top edge of the discharge member to receive the particles of insect life separated from the product.

7. An apparatus as claimed in claim 3 in which the apertures in said discharge member are a plurality of circular rows of slits tapered in an outward direction so that the slits are largest at the outer face of said member.

8. Apparatus as described in claim 3 wherein said treating means includes an annular pocket having an inlet which is at the greater radius of said slanting surface of the discharge member whereby particles of insects are discharged into and retained in said annular pocket.

9. In apparatus for treating a flowable product composed of individual solid parts, the combination of, rotary treating means having an axially disposed inlet and an outlet means radially spaced therefrom, said treating means having a treatment space between said inlet and said outlet means comprising a surface portion that faces the axis and increases in radius in one direction along the axis to give it an angle to the axis and another surface portion that faces the axis and increases in radius in reverse direction along the axis to give said second portion a reverse angle to said axis, and means for driving said rotary means to move the particles of the product and the forms of insect life from said inlet means along said surface portions to said outlet means with a life destroying pressure.

10. In apparatus for effecting the destruction of all insect life in a flowable product composed of individual solid parts, the combination of, product-directing means to receive the product and direct the product along a path which extends through a treatment zone, treating means effective within said treatment zone to contact each particle of insect life within the product with sufficient force to impart lethal trauma to all of said insect life, and means to separate the insect remains from the treated product by flowing the product from the treatment zone and diverting the remains along a separate path.

11. In apparatus for effecting the destruction of all insect life in a flowable product composed of individual solid parts, the combination of, a rotary treating device, confining means associated with said device and forming a treating space confined to the dimensions of said device and forming a substantially unrestricted inlet passageway to allow a substantially even stream of said product to flow freely to said treating space, the smallest dimension of said treating space being larger than the maximum dimension of the individual parts of said product, means to feed said product to said inlet so that it may flow through said treating space, separating means at the outlet of said treating space to receive the treated product therefrom and to discharge the product freely while diverting the insect remains along a separate path for disposition elsewhere, and means for rotating said treating device at a high speed to provide a life-destroying engagement between every individual particle of insect life and said treating device during passage of said product through said treating space, said apparatus including a product outlet from said separating means extending substantially around said treating device through which the product falls away from said treating device.

12. In the art of treating a flowable product composed of individual solid parts, which product may contain particles of foreign matter such as forms of insect life, but which particles of foreign matter are larger than the individual solid parts of the product, the steps which comprise, moving the product into a treating zone, exerting forces within said zone to inflict lethal trauma on any insect life carried thereto with said product, causing the mixed product parts and foreign matter particles to flow from said zone to a constricted path capable of passing the individual solid parts of the product but not the particles of foreign matter, and causing the product parts to flow through said path to separate said product parts from said foreign matter particles.

13. In the art of treating a flowable product composed of individual solid parts, the steps of imparting rotary movement to the particles of the product and to the forms of insect life therein to cause them to move over a surface away from the axis of rotary movement by centrifugal action with such force as to destroy all insect life therein, during such movement screening the product particles from all the forms of insect particles therein, and moving the insect particles away from the screening point.

14. In the art of effecting a destruction of all insect life in a flowable product composed of individual solid parts, the steps which comprise imparting rotary motion to a stream of the product to flow it in a substantially even stream through a zone of treatment under centrifugal force, interfering with the movement of the insect life through the treatment zone by mechanically engaging all of the insect life with sufficient mechanical violence and physical shock to inflict lethal trauma on all insect life without stoppage of the flow of the product and screening from the stream of the product all particles of insect life from the product during such movement.

15. In the art of treating a flowable product composed of individual solid parts, the steps of, moving a stream of the product into a treating zone having confronting surfaces therein, violently contacting said confronting surfaces with all forms of insect life in the product and thereby inflicting lethal trauma on the insect life with the result that all insect life is destroyed, and screening the product as it leaves the treatment zone to separate the insect particles into a stream separate from the stream of the product.

FRANKLIN S. SMITH.

Certificate of Correction

Patent No. 2,391,929. January 1, 1946.

FRANKLIN S. SMITH

It is hereby certified that errors appear in the printed specification of the above numbered patent requiring correction as follows: Page 1, first column, line 31, strike out "the" before the word "typical"; page 4, first column, line 22, for "spaced" read *spacer*; second column, line 31, for "stilts" read *slits*; line 69 for "slots" read *slits*; page 6, second column, line 31, for "in the order" read *on the order*; page 7, first column, line 51, claim 1, for "means, means" read *means*; and that the said Letters Patent should be read with these corrections therein.

Signed and sealed this 23rd day of September, A. D. 1947.

[SEAL]

THOMAS F. MURPHY,
*Assistant Commissioner of Patents.*